US012719036B2

(12) United States Patent
Bloomfield

(10) Patent No.: US 12,719,036 B2
(45) Date of Patent: Aug. 25, 2026

(54) MASS SPECTROMETER CALIBRATION

(71) Applicant: DH Technologies Development Pte. Ltd., Singapore (SG)

(72) Inventor: Nicholas G. Bloomfield, Newmarket (CA)

(73) Assignee: DH TECHNOLOGIES DEVELOPMENT PTE. LTD., Singapore (SG)

( * ) Notice: Subject to any disclaimer, the term of this patent is extended or adjusted under 35 U.S.C. 154(b) by 511 days.

(21) Appl. No.: 18/273,171

(22) PCT Filed: Jan. 18, 2022

(86) PCT No.: PCT/IB2022/050409
§ 371 (c)(1),
(2) Date: Jul. 19, 2023

(87) PCT Pub. No.: WO2022/157625
PCT Pub. Date: Jul. 28, 2022

(65) Prior Publication Data

US 2024/0105435 A1 Mar. 28, 2024

Related U.S. Application Data

(60) Provisional application No. 63/250,872, filed on Sep. 30, 2021, provisional application No. 63/139,682, filed on Jan. 20, 2021.

(51) Int. Cl.
*H01J 49/00* (2006.01)
*H01J 49/36* (2006.01)

(52) U.S. Cl.
CPC ........ *H01J 49/0009* (2013.01); *H01J 49/004* (2013.01); *H01J 49/36* (2013.01)

(58) Field of Classification Search
CPC ....... H01J 49/0009; H01J 49/004; H01J 49/36
See application file for complete search history.

(56) References Cited

U.S. PATENT DOCUMENTS

2014/0306106 A1 10/2014 Olney
2018/0047549 A1 2/2018 Quaas et al.

FOREIGN PATENT DOCUMENTS

EP 2786399 A1 10/2014
JP 2005353428 A 12/2005
(Continued)

OTHER PUBLICATIONS

International Search Report and Written Opinion, PCT/IB2022/050409, Dated Apr. 22, 2022, pp. 14.

*Primary Examiner* — Mark R Gaworecki
(74) *Attorney, Agent, or Firm* — Potomac Law Group, PLLC; Reza Mollaaghababa; Brian Hairston

(57) ABSTRACT

In one aspect, systems and method are provided for calibrating a hybrid mass spectrometer. The calibration may include, for instance, an accurate mass calibration and a nominal mass calibration performed across a plurality of transmission widths and scanning speeds applied for each reference standard, ideally each reference standard representing a different m/z, to produce a matrix of correction factors corresponding to each of the transmission width and scanning speed pairs at the m/z values for the reference standards evaluated. A multi-parameter interpolation may be applied to identify a correction factor to be used for a subsequent analysis transmission width and scanning speed pair that differs from the plurality of transmission widths and scanning speeds used to produce the correction factors.

19 Claims, 14 Drawing Sheets

(56) References Cited

FOREIGN PATENT DOCUMENTS

| | | | | | |
|---|---|---|---|---|---|
| JP | 2018045999 | A | | 3/2018 | |
| WO | WO-03103006 | A2 | * | 12/2003 | .............. H01J 49/28 |
| WO | WO-2013081581 | A1 | * | 6/2013 | ............ H01J 49/004 |

* cited by examiner

MASS SPECTROMETER CALIBRATION

RELATED APPLICATIONS

This application is a 35 U.S.C. 371 national stage fling of International Application No. PCT/IB2022/050409 filed on Jan. 18, 2022, which claims priority to U.S. provisional application No. 63/139,682 filed on Jan. 20, 2021, entitled "MS Calibration," and U.S. provisional application No. 63/250,872 filed on Sep. 30, 2021, entitled "Mass Spectrometer Calibration" which is incorporated herein by reference in their entireties.

BACKGROUND

Mass spectrometers are analytical instruments that are used to analyze samples to identify their composition and/or measure the quantity of an analyte in a given sample.

Hybrid mass spectrometers, which combine two different types of mass analyzers, provide the benefit of the different performance characteristics provided by each of the mass analyzers within a single instrument.

A useful type of a hybrid mass spectrometer includes a series combination of a nominal mass spectrometer and an accurate mass spectrometer. A number of manufacturers offer hybrid mass spectrometer products with a variety of different mass analyzer types, including multipole, orthogonal time of flight (ToF), electrostatic traps, linear ion traps, etc. SCIEX, for example, offers a range of QTOF instruments that combine a triple quadrupole mass spectrometer with an orthogonal time-of-flight (ToF) mass spectrometer as the respective nominal mass and accurate mass spectrometers.

Mass spectrometer performance varies with a variety of conditions including environmental, contamination, sample composition, instrument state, individual instrument variability, etc. Standard practice when operating a mass spectrometer is to perform a calibration operation to ensure accurate operation of the instrument at regular time intervals. The calibration of hybrid mass spectrometers can be complicated in that each of the two different types of mass spectrometers needs to be calibrated in relation to the other. This hybrid calibration has generally involved two separate calibration operations, a nominal mass calibration operation and an accurate mass calibration both of which are performed against known reference standards in order to ensure that each of the two mass analyzers is operating within specification and within a defined variance range with the other.

An accurate mass calibration operation generally involves supplying a pure reference standard of known composition (e.g., a pure Cesium reference standard) for analysis by the accurate mass spectrometer. The calibration may be performed by analyzing the reference standard, comparing the analysis results against the expected value and correcting any offset between the accurate mass spectrometer analysis results and the expected value for the reference standard.

Depending upon user requirements, the accurate mass calibration operation may be performed daily, weekly, or monthly, and typically requires on the order of 20-30 minutes to complete. Many users prefer to perform the accurate mass calibration at least once every 24 hours to ensure that each daily set of analysis results are accurate.

A nominal mass calibration operation is more time consuming and complicated than an accurate mass calibration operation as variance in analysis results for nominal mass instruments typically includes an m/z dependent component.

The nominal mass calibration operation typically requires calibrating against known reference standards and collecting analysis results at each of the different scanning speeds and transmission window widths that will be used for the analysis. For instance, while supplying a reference standard the instrument may be set for a given transmission width and stepped through a plurality of different scanning speeds, to collect calibration results for that transmission width at each of the scanning speeds. The procedure may then be repeated across a plurality of transmission widths to generate a matrix of calibration results that cover the desired mass range. Based on this matrix of calibration results the transmission widths may be re-aligned at each of the transmission windows so that analysis results produced by the nominal mass analyzer match results produced by the accurate mass analyzer.

Some commercial instruments have lessened the burden of running the nominal mass calibration operation by executing the different scanning speeds and transmission widths as a batch operation. With this feature, the user sets up the hybrid mass spectrometer with an infusion of one or more standards and a batch program that defines the stepwise scanning speeds and transmission window widths to be evaluated. Once the batch program is executed, the instrument will automatically step through the scanning speeds and transmission windows widths to build the matrix of calibration results without further user intervention. The instrument can typically complete a calibration batch run in about 30 minutes, depending upon the number of scan speeds and transmission bandwidths defined for the batch run. The user must then review the calibration data, based upon a standard threshold level of variance, in order to complete calibration of the instrument.

While user time is released with the use of a batch program, the instrument is tied up running the calibration operations and reference standards and solvent are consumed.

SUMMARY

The above identified problems with generating calibrated mass data in hybrid mass spectrometers leads to wasted time, and less accurate analysis results. There are additional problems with the existing calibration methods. For example, the inventor has evaluated the effectiveness of the standard calibration operations and has observed that while the instrument appears calibrated during the calibration operations when running on infused reference standards, the calibration may be off when operating the instrument on analytical samples with a full sample load. The inventor has observed a resolution drift when running a full sample load, such as a large proteomics sample, on an instrument that was successfully calibrated using the conventional reference standard infusion. This may be due to contamination on the ion optics causing a shift when the hot ion beam generated from the full sample load contacts the ion optics. As a result, it appears that conventional calibration based on a low infusion of reference standards may not necessarily be valid for large proteomics samples.

While the inventor has confirmed that SCIEX commercial hybrid mass spectrometers maintain stable nominal mass calibration for months, users choose to re-calibrate both nominal mass and accurate mass analyzers at a higher cadence, such as weekly and even daily. Given the enormous investment of time, resources, and capital into research efforts it is understandable that users would prefer to calibrate nominal mass and accurate mass spectrometers together to avoid the chance of generating faulty analysis results.

Given these end use requirements, the inventor has developed the present novel approach to hybrid mass spectrometer calibration that leverages accurate mass calibration, which is proven stable and accurate with little variance between calibration events, to calibrate the nominal mass spectrometer. Accordingly, it is possible to calibrate the nominal mass spectrometer while running samples based on the calibrated accurate mass spectrometer analysis results. Furthermore, this approach enables verification and reporting to confirm analysis results on each sample run without having to re-calibrate the nominal mass spectrometer. In other words, embodiments can utilize the data generated using a combination of a nominal mass analyzer (i.e., a mass analyzer that has not been calibrated via one or more calibrants) and an accurate mass analyzer (i.e., a mass analyzer that has been calibrated using one or more calibrants) to derive m/z corrections for mass signals obtained for a sample under investigation.

In some embodiments in which the mass data can be compiled such that the mass data is segregated based on the transmission window of the nominal mass analyzer that was employed to collect the data. In such embodiments, each data compilation associated with a particular transmission window of the nominal mass analyzer can include an indicator (e.g., in the form of a file header) that provides information about the transmission window of the nominal mass analyzer. In some such embodiments, the calibration correction values can be employed to adjust the header data to re-position mass analysis results in each transmission window.

In some embodiments, a hybrid mass spectrometer including a nominal mass spectrometer and an accurate mass spectrometer is operative to perform data independent acquisition operations and to calibrate the nominal mass spectrometer based on accurate mass analysis results. The data independent operations may comprise, for instance, scanning quadrupole data independent acquisition operations.

In some aspects, the hybrid mass spectrometer may be operative to perform mass analysis on a sample to generate mass analysis results, and to calibrate compilation of mass data by taking into account the differences between one or more nominal operational settings of the nominal mass spectrometer (e.g., transmission bandwidth of a mass filter) and the actual operational setting of the nominal mass spectrometer derived from analysis of mass data generated by an accurate mass analyzer calibrated via one or more calibrants. The calibration may include amending nominal mass analysis results based on the calibration to generate calibrated nominal mass analysis results. In some aspects, a calibration metric indicative of a variance between the current calibration and a previous calibration may be evaluated.

In an embodiment, the calibration may include evaluating the mass analysis results to identify from the accurate mass results one or more residual precursor ions within an m/z transmission window. The evaluation may be repeated across a plurality of transmission windows to cover a mass range to be calibrated for the sample being mass analyzed. In some embodiments, each identified precursor ion may be paired with a centroid of corresponding nominal mass analysis results within that transmission window to identify any offset or variance between an expected value, as provided by the accurate mass results, and a measured value, as provided by the nominal mass results. In some embodiments, such an offset can be used to adjust the header of a data compilation that identifies the transmission bandwidth of a transmission window associated with the nominal mass spectrometer.

Conveniently, a plurality of precursor ions may be identified in each of the transmission windows to provide a plurality of corresponding offset values for that transmission window. In some aspects, the precursor ions may each be evaluated in relation to one another to identify any outliers to be discarded. A correction factor for each transmission window may be generated based on the plurality of offset values for that transmission window. In some aspects, the spread or variance of the offset values may be evaluated to confirm a confidence metric of the generated correction factor.

In some aspects, each of the plurality of correction factors may further be evaluated to confirm consistency with one another. The consistency may be confirmed, for instance, by fitting a trend line to the plurality of correction factors and evaluating each correction factor to confirm it lies within an expected range of the trend line. In some aspects, the consistency may be confirmed by evaluating each correction factor to confirm it is within an expected range of neighboring correction factors.

Each of the correction factors may be applied to shift the mass analysis results within a corresponding transmission window based on the offset defined by that correction factor. In some aspects, the correction factors may be applied by correcting all of the mass analysis results based on the defined offset within a corresponding transmission window. In some aspects, the correction factors may be applied by overwriting header data to re-position mass analysis results in each transmission window based on the defined offset. In some aspects, the re-positioning may include re-positioning the mass analysis results within that transmission window, while maintaining continuity at the boundaries of that transmission window with adjacent transmission windows. In some aspects, the transmission windows may include an overlap, and the re-positioning may include re-positioning the mass analysis results within that transmission window, while maintaining continuity at the boundaries of that transmission window with adjacent transmission windows.

In a related aspect, a method for calibrating a hybrid mass spectrometer comprising a nominal mass spectrometer and an accurate mass spectrometer is disclosed, which includes analyzing a sample using the hybrid mass spectrometer and collecting accurate mass analysis results and nominal mass analysis results for the sample. For at least one mass transmission window of the nominal mass spectrometer, the nominal mass analysis results and the accurate mass analysis results within the mass transmission window can be evaluated to identify at least one difference between the nominal mass analysis results and the accurate mass analysis results. Based on the identified difference, the nominal mass analysis results within the mass transmission window may be corrected to align it with the accurate mass analysis results. In some embodiments, the identification of said at least one difference comprises identifying at least one precursor ion in the accurate mass analysis results and comparing an m/z ratio of the at least one precursor ion derived from the accurate mass analysis results with a corresponding m/z ratio corresponding to at least one precursor ion from the nominal mass analysis results.

In a related aspect, a system and/or method is provided for calibration of a hybrid mass spectrometer. The calibration may include, for instance, an accurate mass calibration and a nominal mass calibration performed across a plurality of transmission widths and scanning speeds applied for each reference standard, ideally each reference standard representing a different m/z ratio, to produce a matrix of correction factors corresponding to each of the transmission width and scanning speed pairs at the m/z values for the reference standards evaluated. A multi-parameter interpolation may be applied to identify a correction factor to be used for a subsequent analysis transmission width and scanning speed pair that differs from the plurality of transmission widths and scanning speeds used to produce the correction factors.

In a related aspect, a method for calibrating a hybrid mass spectrometer having an accurate mass analyzer combined with a nominal mass analyzer is disclosed, which includes calibrating the accurate mass analyzer using one or more reference standards, analyzing a sample using the nominal mass analyzer and the accurate mass analyzer to generate one or more corresponding nominal and calibrated accurate mass signals associated with the sample, and calibrating the nominal mass analyzer by comparing the nominal and the calibrated accurate mass signals.

In some embodiments, a controller can adjust one or more operating parameters of the nominal mass analyzer so as to generate a plurality of precursor transmission windows, where the transmission windows are partially overlapping. The precursor ions passing through each transmission window can be received by a collision cell in which at least a portion of the precursor ions can be fragmented to generate a plurality of product ions. The product ions and any residual precursor ions can be received by the accurate mass analyzer (e.g., a time-of-flight (ToF) mass analyzer). The accurate mass analyzer can generate signals indicative of the masses of the product ions and one or more residual precursor ions. In some such embodiments, the transmission windows can be scanned and the signals generated by the accurate mass analyzer can be collected.

The operating parameters associated with the scanning of the transmission window of the nominal mass analyzer can be used to determine the lower m/z end, the upper m/z end, the transmission bandwidth as well as the scan rate associated with the scanned transmission window. By way of example, when the nominal mass analyzer is a quadrupole mass analyzer, the operating parameters can include the RF and DC voltages applied to the quadrupole rods to establish a transmission bandwidth associated with the quadrupole mass analyzer as well as one or more parameters associated with the adjustments of the RF and/or DC voltages for scanning the transmission window.

In some embodiments, a controller in communication with the nominal mass analyzer can be utilized to adjust one or more operating parameters associated with the nominal mass analyzer, such as the RF and/or DC voltages applied to the quadrupole rods of a quadrupole mass analyzer, to establish a transmission window for passage of ions and to scan the transmission bandwidth associated with the transmission window.

In some embodiments, the mass signals generated by the accurate mass analyzer (e.g., a ToF mass analyzer) can be stored such that the mass signal data associated with each transmission window is stored in a plurality of data bins, where each data bin corresponds to a fraction of the transmission bandwidth of a given transmission window. As noted above, each data bin is herein considered as corresponding to an "experiment." In some such embodiments, for every $n^{th}$ experiment (e.g., for every $5^{th}$ experiment), an extracted ion chromatogram (XIC) can be generated and one or more peaks can be identified as potentially corresponding to the residual precursor ions (i.e., precursor ions that did not undergo fragmentation). For a peak that is considered as corresponding to a precursor ion, the respective peaks in a number of experiments that precede and follow the $n^{th}$ experiment can be identified. In some embodiments, the total number of the experiments can correspond to the transmission bandwidth of the transmission window.

The intensity profile of the mass peaks across these experiments as a function of the nominal transmission bandwidth can be plotted and utilized to obtain a calibration correction for the respective transmission window. For example, the m/z ratio associated with a residual precursor ion detected via the accurate mass analyzer can be compared with the centroid of the intensity profile of the mass peaks as a function of the nominal m/z ratios to arrive at a calibration correction factor.

As discussed further below, such a calibration correction factor can be utilized to edit the header of a data file containing the nominal parameters associated with the transmission window, e.g., the start m/z and the end m/z associated with a transmission bandwidth.

In a related aspect, a hybrid mass spectrometer is disclosed, which includes a nominal mass analyzer configured to provide a plurality of transmission windows allowing passage of at least one precursor ion, and a collision cell positioned downstream of said nominal mass analyzer for receiving said at least one precursor ion and causing fragmentation thereof so as to generate a plurality of product ions. An accurate mass analyzer is positioned downstream of the collision cell for receiving ions exiting the collision cell and generating a mass spectrum thereof. An analysis module is configured to receive one or more operating parameters of the nominal mass analyzer as well as the mass spectrum generated by the accurate mass analyzer. The analysis module is further configured to identify a mass signal associated with the precursor ion in mass spectrum generated by the accurate mass analyzer and calibrate the nominal mass analyzer based on an m/z ratio of the precursor ion in said mass spectrum and said one or more operating parameters of said nominal mass analyzer.

In a related aspect, a system and/or method is provided for calibration of mass data acquired by a hybrid mass spectrometer, which includes a nominal mass analyzer and an accurate mass analyzer. The calibration can include utilizing mass data generated by the accurate mass analyzer to adjust the compilation of mass data so as to account for any discrepancies between compiled data indicative of the nominal parameters of the nominal mass analyzer and values of those parameters derived via analysis of mass data generated by the accurate mass analyzer.

In some embodiments, the nominal mass analyzer can include a plurality of rods arranged in a multipole (e.g., a quadrupole) configuration and configured for application of RF and DC voltages thereto. In some such embodiments, the accurate mass analyzer can be a time-of-flight (ToF) mass analyzer that is calibrated using one or more reference standards.

Further understanding of various aspects of the present teachings can be obtained by reference to the following detailed description and the associated drawings, which are described briefly below.

DETAILED DESCRIPTION

Figure 1:
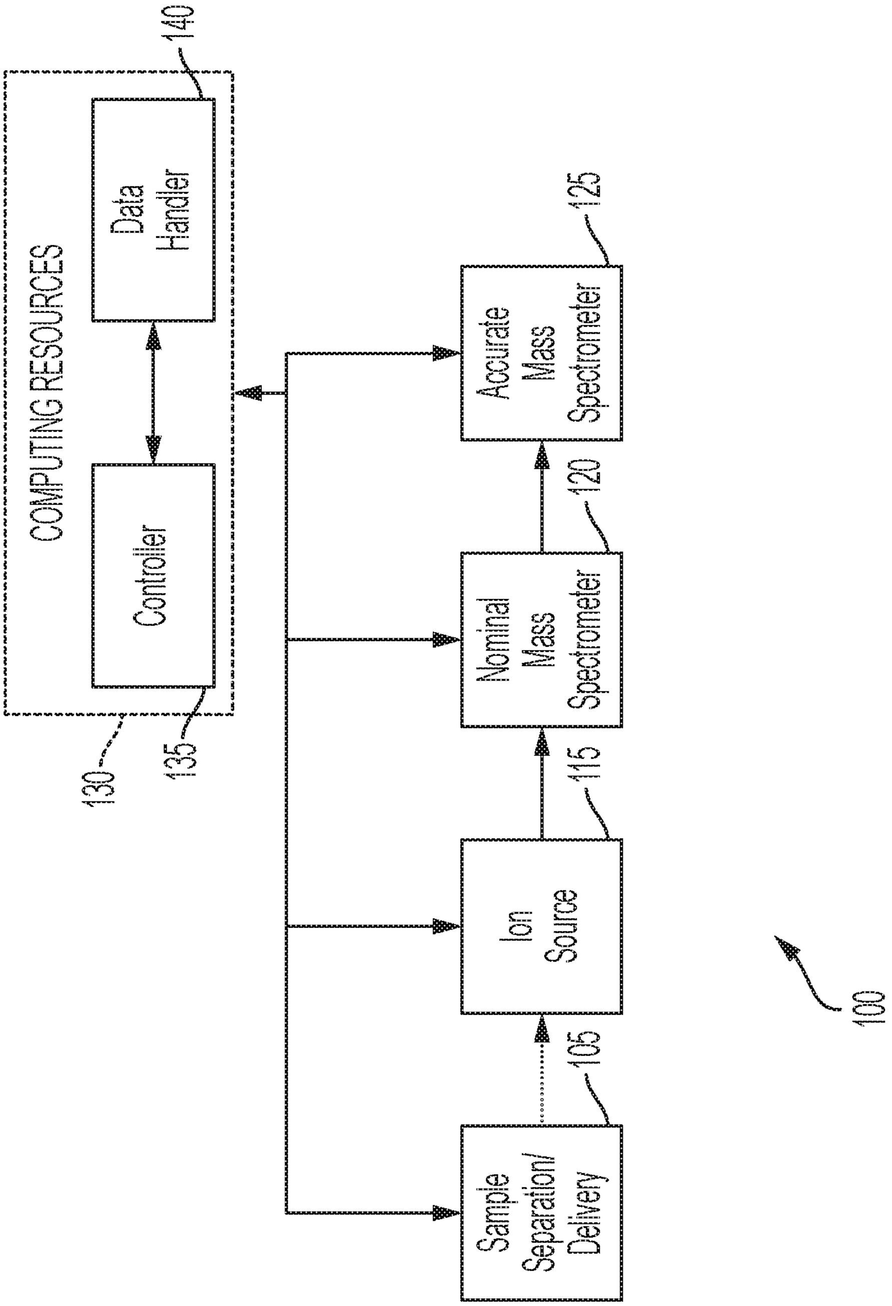
FIG. 1 is an example of a hybrid mass spectrometer according to an embodiment of the present teachings.

It will be appreciated that for clarity, the following discussion will explicate various aspects of embodiments of the present disclosure, while omitting certain specific details wherever convenient or appropriate to do so. For example, discussion of like or analogous features in alternative embodiments may be somewhat abbreviated. Well-known ideas or concepts may also for brevity not be discussed an any great detail. One of ordinary skill will recognize that some embodiments of the present disclosure may not require certain of the specifically described details in every implementation, which are set forth herein only to provide a thorough understanding of the embodiments. Similarly it will be apparent that the described embodiments may be susceptible to alteration or variation according to common general knowledge without departing from the scope of the disclosure. The following detailed description of embodiments is not to be regarded as limiting the scope of the applicant's teachings in any manner.

As used herein, the terms "about" and "substantially equal" refer to variations in a numerical quantity that can occur, for example, through measuring or handling procedures in the real world; through inadvertent error in these procedures; through differences in the manufacture, source, or purity of compositions or reagents; and the like. Typically, the terms "about" and "substantially" as used herein means 10% greater or lesser than the value or range of values stated or the complete condition or state. For instance, a concentration value of about 30% or substantially equal to 30% can mean a concentration between 27% and 33%. The terms also refer to variations that would be recognized by one skilled in the art as being equivalent so long as such variations do not encompass known values practiced by the prior art.

As used herein the term "and/or" includes any and all combinations of one or more of the associated listed items and may be abbreviated as "/".

The term "a nominal mass spectrometer" or "a nominal mass analyzer" refers to a mass spectrometer or a mass analyzer that is not calibrated via one or more reference calibrants. The term "an accurate mass spectrometer" or "an accurate mass analyzer" refers to a mass spectrometer or a mass analyzer that has been calibrated via one or more reference calibrants.

The present teachings are generally related to methods and systems for calibrating mass data generated by a hybrid mass spectrometer, and in particular, for calibrating a nominally calibrated mass analyzer (e.g., one or more operating parameters of a nominally calibrated mass analyzer) via mass signals obtained by an accurately calibrated mass analyzer, which is calibrated via one or more reference calibrants. More specifically, as discussed in more detail below, in embodiments, the nominally calibrated mass analyzer can be configured to provide a scanning transmission window that allows the passage of one or more precursor ions through the mass analyzer. A collision cell positioned downstream of the mass analyzer can receive the precursor ions and cause fragmentation of at least a portion thereof to generate a plurality of product ions. The ions exiting the collision cell, which can include product ions as well as some residual precursor ions, are received by the accurate mass analyzer. As discussed herein, the mass peaks associated with one or more residual precursor ions and their respective m/z ratios determined by the accurate mass analyzer can be utilized to calibrate the nominal mass analyzer.

FIG. 1 presents an exemplary hybrid mass spectrometer 100 according to various embodiments of the present teachings. The hybrid mass spectrometer 100 is an electromechanical instrument for separating and detecting ions of interest from a given sample. The hybrid mass spectrometer 100 includes computing resources 130 to carry out both control of the system components and to receive and manage the data generated by the hybrid mass spectrometer 100.

In the embodiment of FIG. 1, the computing resources 130 are illustrated as having separate components: a controller 135 for directing and controlling the system components and a data handler 140 for receiving and assembling a data report of the detected ions of interest. Depending upon requirements, the computing resources 130 may comprise more or less components than those depicted, may be centralized, or may be distributed across the system components. Typically, the detected ion signals generated by the nominal mass analyzer 120 and the accurate mass analyzer 125 are formatted in the form of one or more mass spectra based on control information as well as other process information of the various system components. Subsequent data analysis using a data analyzer (not illustrated in FIG. 1) may be performed on the data report (e.g. on the mass spectra) in order to interpret the results of the mass analysis performed by the hybrid mass spectrometer 100.

In some embodiments, hybrid mass spectrometer 100 may include some or all of the components as illustrated in FIG. 1. For the purposes of the present explanation, hybrid mass spectrometer 100 can be considered to include all of the illustrated components, though the computing resources 130 may not have direct control over or provide data handling to, the sample separation/delivery component 105.

The sample separation/delivery component 105 may comprise any known delivery component for supplying a sample to an ion source 115. For example, in some embodiments, the sample separation/delivery component 105 may comprise a liquid chromatography (LC) column for separating and eluting a sample to the ion source 115. In some embodiments, the sample separation/delivery component 105 may comprise a gas chromatography (GC) for separating constituents of a sample and providing the separated sample constituents to the ion source 115 in different time intervals. In some embodiments, the sample separation/delivery component 105 may comprise an open port interface (OPI) for capturing, diluting, and transporting diluted sample to the ion source 115 without additional pre-treatment. The OPI may be situated to receive diverted sample from a process flow, or may be arranged to receive metered sample from a sample delivery device. In some aspects, the sample separation/delivery component 105 may comprise a combination of an OPI with a sample delivery device in the form of an acoustic droplet ejection component for ejecting droplets of sample into the OPI.

Conveniently, in some aspects, a sample may be delivered directly to an OPI as drops ejected by an acoustic droplet ejector (ADE) from a sample reservoir. The combination of an ADE ejecting sample droplets into an OPI may be referred to as Acoustic Ejection Mass Spectrometry (AEMS).

In the context of this present application, a separation/delivery system 105 comprises a delivery system capable of delivering measurable amounts of a sample, typically a combination of an analyte and accompanying solvent sampling fluid, to an ion source 115 that is disposed downstream of the separation system 105 for ionizing the delivered sample. A nominal mass spectrometer 120 receives the generated ions from the ion source 115 for mass filtering and/or fragmentation and may generate nominal mass analysis results indicative of detected ions to be delivered to the data handler 140. The nominal mass analyzer 120 is operative to selectively separate, and/or generate by fragmentation, ions of interest from the generated ions received from the ion source 115 based on their mass-to-charge ratios and to deliver the ions of interest to an accurate mass spectrometer 125 that generates accurate mass analysis results indicative of detected ions to the data handler 140. It will also be appreciated that the ion source 115 can have a variety of configurations as is known in the art.

For the purposes of this application, components of the hybrid mass spectrometer 100 may be considered as operating as a single system. Conventionally, the combination of the mass analyzer 120 and the ion detector 125 along with relevant components of the controller 135 and the data hander 140 are typically referred to as a mass spectrometer and the sample separation/delivery device may be considered as a separate component. It will be appreciated, however, that while some of the components may be considered “separate,” such as the separation system 105, all the components of a hybrid mass spectrometer 100 operate in coordination in order to analyze a given sample.

When operating a hybrid mass spectrometer with orthogonal nominal mass and accurate mass spectrometers, it is standard practice to perform both an accurate mass calibration, using one or more reference standards, and a nominal mass calibration, using one or more reference standards and evaluating instrument performance for a plurality of transmission widths and scanning speeds. An accurate mass correction factor may be obtained for the accurate mass spectrometer to calibrate its analysis results across the full range of expected operating conditions. For the nominal mass spectrometer, however, a plurality of correction factors are obtained, each corresponding to one of the transmission width and scanning speed pairs evaluated against the reference standard(s). The nominal mass spectrometer may be operated at any of the evaluated transmission width and scanning speed pairs and the corresponding correction factor may be applied.

In an embodiment, a multi-parameter interpolation may be applied to permit calibration of the nominal mass spectrometer to operate at a transmission width and scanning speed pair that was not previously evaluated during the nominal mass calibration. Through experimentation it has been demonstrated that applying a multi-parameter interpolation to obtain a calculated correction factor corresponding to the reference standard(s) and actual transmission width and scanning speed pairs being used for analysis provides a more accurate calibration than applying a “closest” correction factor from the plurality of correction factors.

In alternate embodiments, the conventional nominal mass calibration may be eliminated and the mass data may be calibrated from the accurate mass analysis results, e.g., via adjusting the headers of one or more data files, where the headers indicate one or more operating parameters of the nominal mass spectrometer, such as its bandwidth. Conveniently, such embodiments can provide the ability to avoid the time consuming nominal mass calibration process and to provide for calibration of the nominal mass results in every analysis run.

Within an analysis run, a plurality of transmission window widths and scanning speed pairs, “experiments,” are conducted over a mass range of interest. Each experiment can correspond, for example, to data obtained in a fraction of the transmission bandwidth of a sample ion transmission window associated with the nominal mass spectrometer. As noted above, that data obtained in each fraction can be compiled as a data bin corresponding to one “experiment.”

Without calibration of the nominal mass spectrometer, in embodiments, the transmission bandwidths associated with the nominal mass spectrometer may be shifted by an amount that varies across the mass range of interest. The data generated by the accurate mass spectrometer can be used to correct for the compilation of data corresponding to the nominal transmission bandwidth.

Figure 2A:
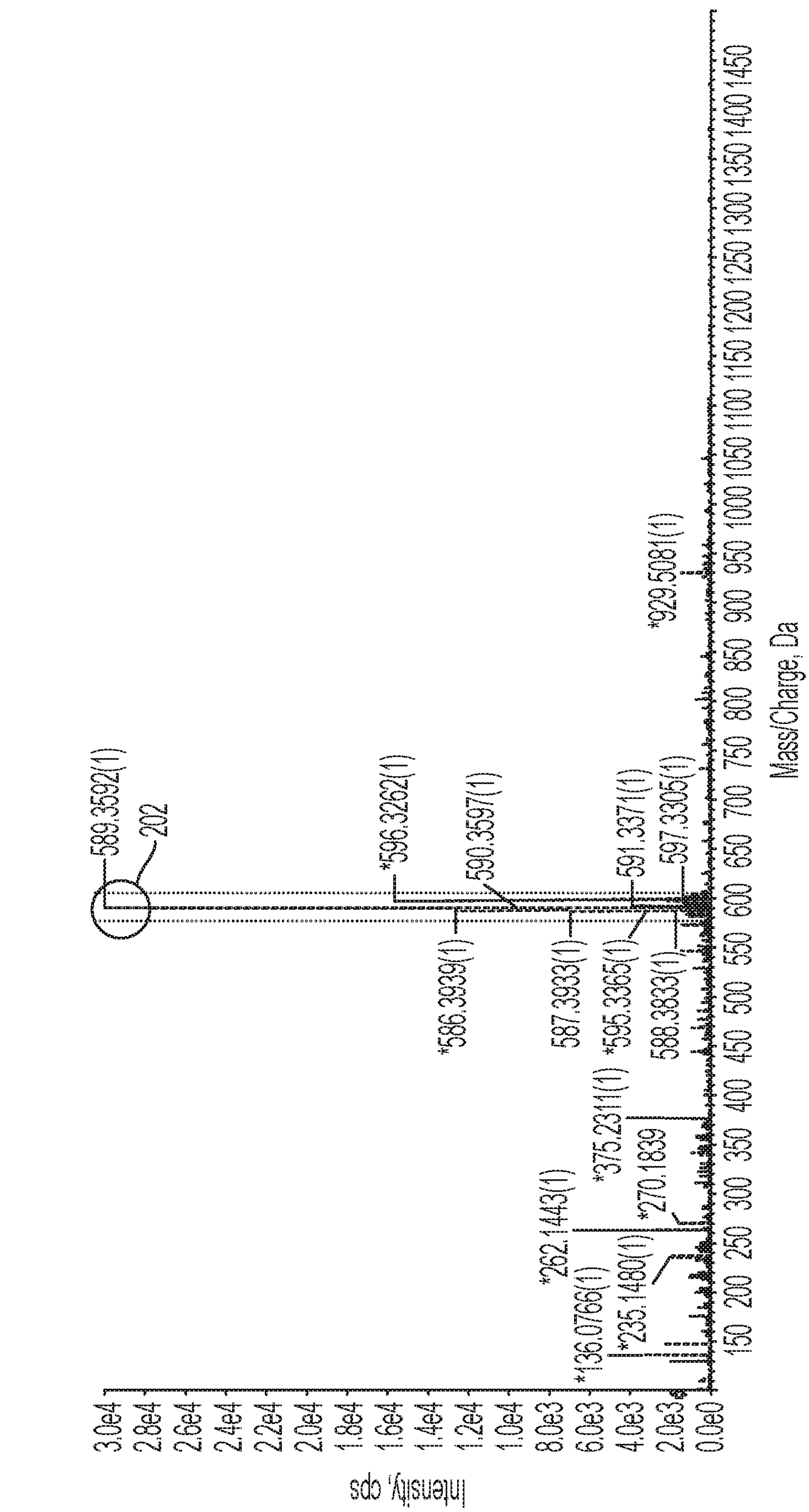
FIG. 2A depicts an extracted ion chromatogram (XIC) of a sample.
Figure 2B:
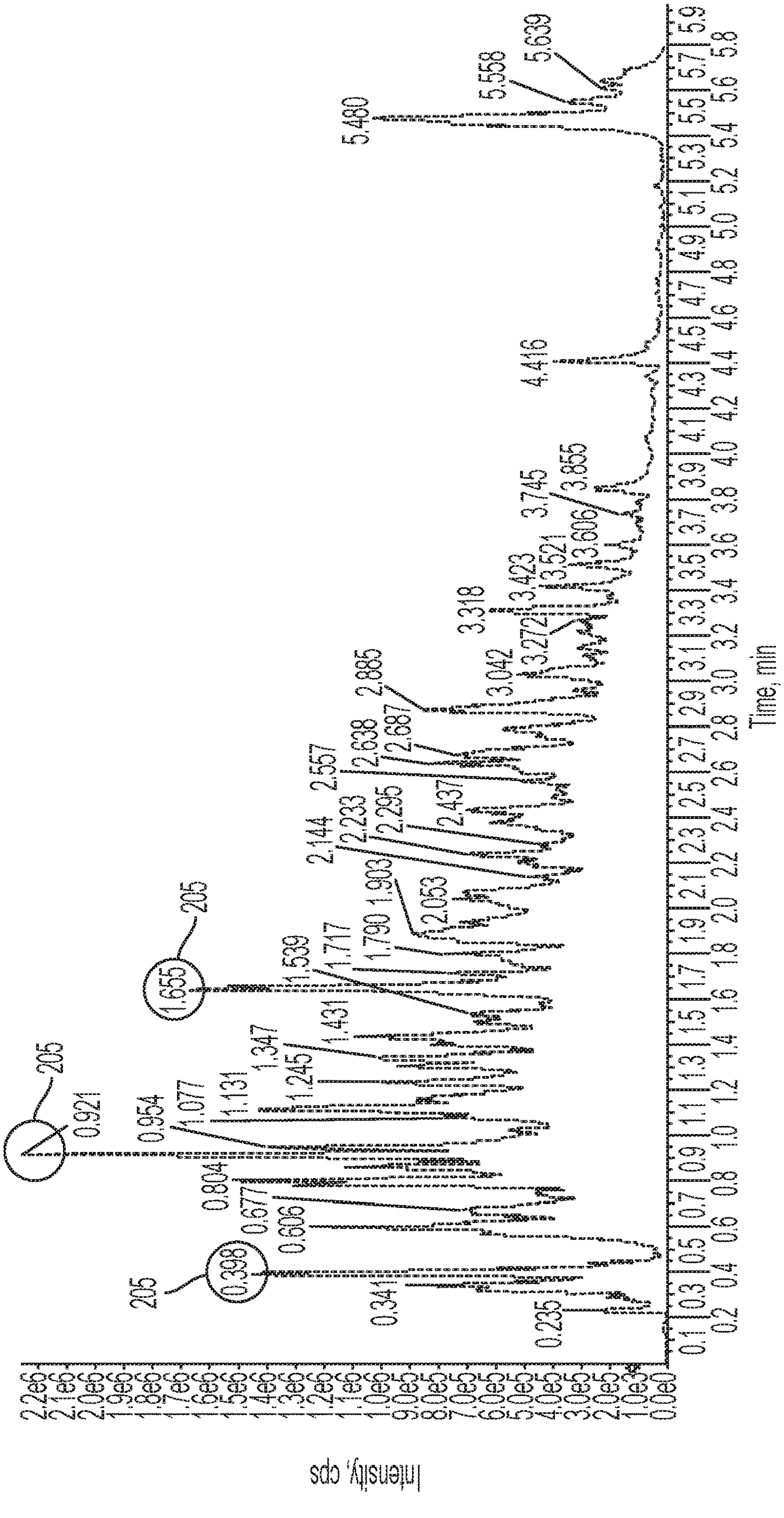
FIG. 2B depicts a total ion chromatogram (TIC) corresponding to a region of the XIC around the mass peak 202.
Figure 2C:
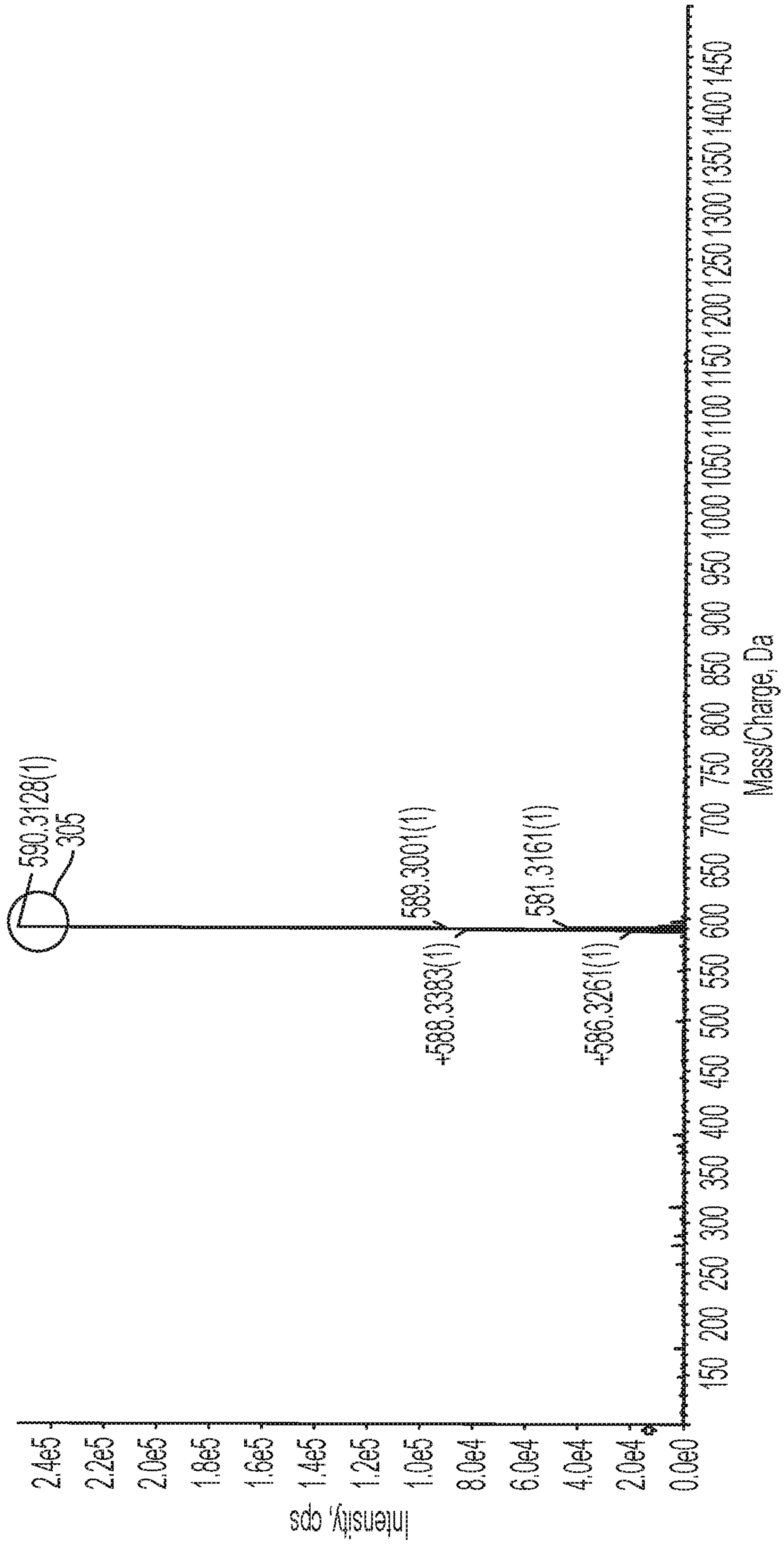
FIGS. 2C and 2D are spectra that confirm the base peak corresponds to an m/z in the transmission window.

During analysis, sample ions may be fragmented in the nominal mass spectrometer, generating potential full mass spectra outside of the transmission window in the analysis results. Referring to FIGS. 2A, 2B, and 2C, in this embodiment an Extracted Ion Chromatogram (XIC) may be performed on every $n^{th}$ experiment as part of an analysis. As illustrated in the full XIC spectra of FIG. 2A, a dense region of mass peaks, around m/z 589, corresponds to unfragmented precursor ions being transmitted by the nominal mass spectrometer through the transmission window. In addition, masses within the m/z range from 590.5 to 592.5 are also being passed through the transmission window for this experiment.

With the assumption that the experiment precursor transmission width is smaller than or equal to half the transmission width, the data may then be organized into precursor widths, such as transmission width/X=precursor width (X=5 as an example). The XIC region corresponds to the transmission width or region for that experiment. Generally the number of XIC's (N) corresponds to the number of experiments that are needed to span a mass range of interest. The general approach then follows to select a transmitted mass (e.g., based on highest intensity) and compare accurate mass analysis results against nominal mass analysis results to identify the shift in the nominal mass analysis results.

FIG. 2B illustrates a mass peak at a retention time of about 0.92 minutes, corresponding to the highest intensity peak 202 of FIG. 2A at m/z 589.3592. Within each XIC, the highest intensity m peaks 205 are identified. In the example of FIG. 2B, m=3, however other numbers of high-intensity peaks may be identified. By way of example, the inventor has evaluated m=3, m=5, along with other numbers of peaks. Conveniently, the plurality of peaks utilized for comparing nominal mass results with accurate mass results may provide a statistically robust measure for determining appropriate correction factors to apply to the nominal mass analysis results.

The highest intensity m peaks 205 may be sorted by intensity and, for each of the m peaks 205, mass spectra may be generated at the corresponding peak apex.

Figure 2D:
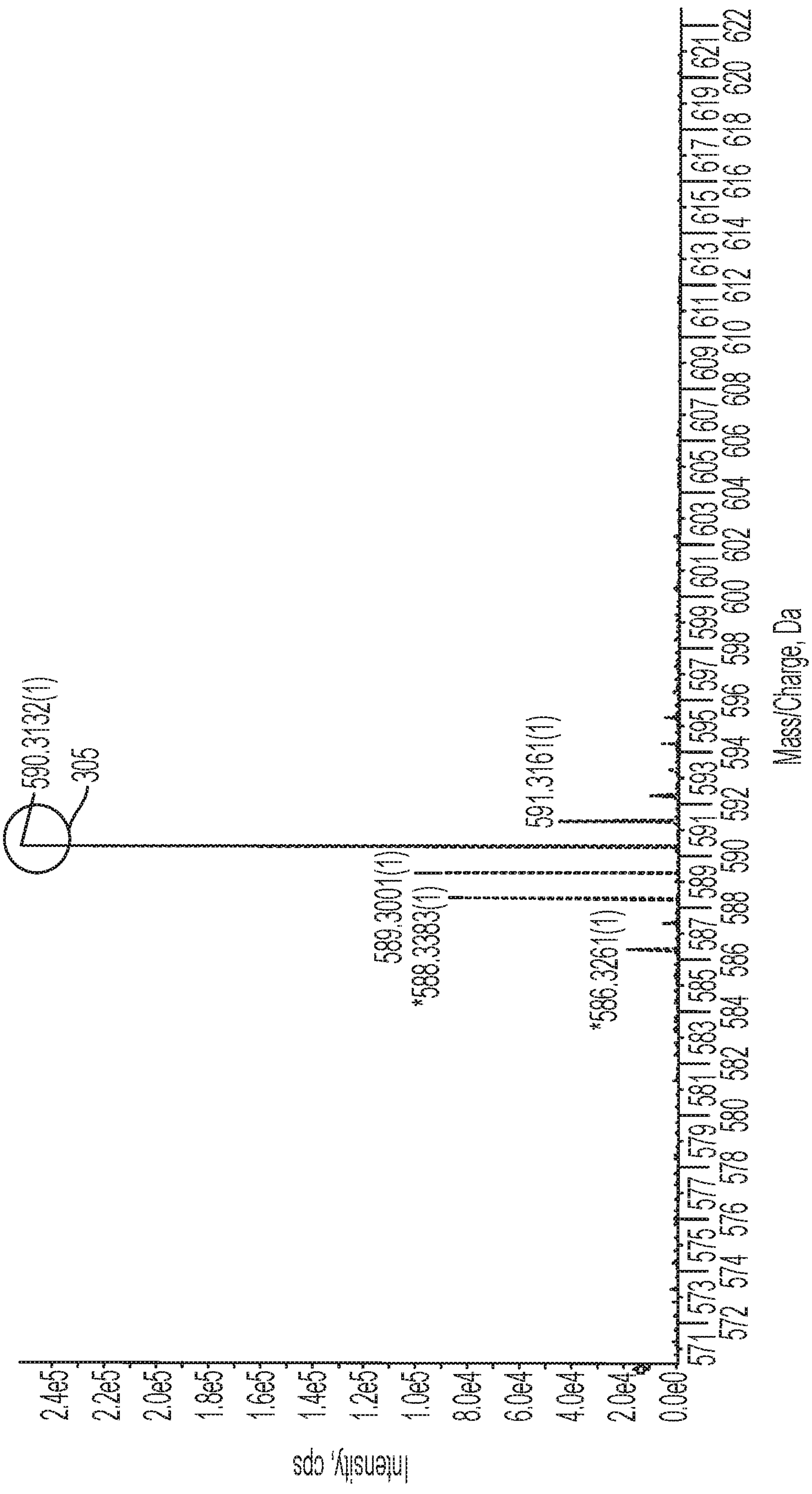
Figure 3:
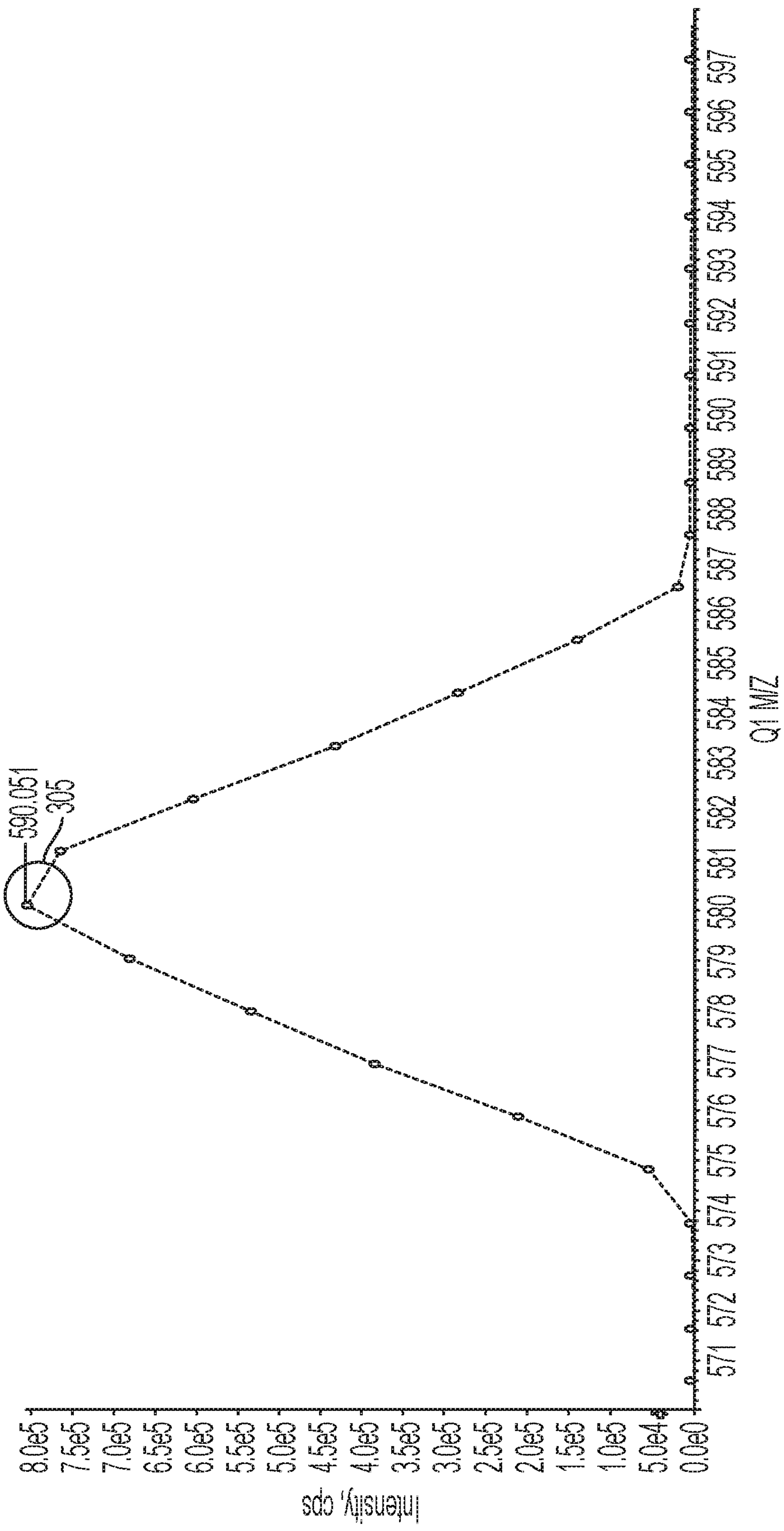
FIG. 3 shows a nominal mass analysis result.

Referring to FIGS. 2C and 2D, the base peak 305 can be identified and evaluated to confirm that it corresponds to an m/z within the transmission window for that experiment. Referring to FIG. 3, a precursor profile can be generated from the nominal mass results by plotting peak intensity for adjacent spectra before and after that of the $n^{th}$ experiment. In general, the number of adjacent spectra before and after the $n^{th}$ experiment corresponds to a number of experiments within the transmission window. The highest intensity accurate mass peak 305 from the accurate mass analysis results, located at mass 590.3138, can be identified from the accurate mass spectra. Referring to FIG. 3, the nominal mass analysis results can be reviewed to locate a corresponding nominal mass peak, e.g., in the form of a centroid as represented by the maximum transmission intensity as the transmission window is scanned across the mass range.

Figure 4:
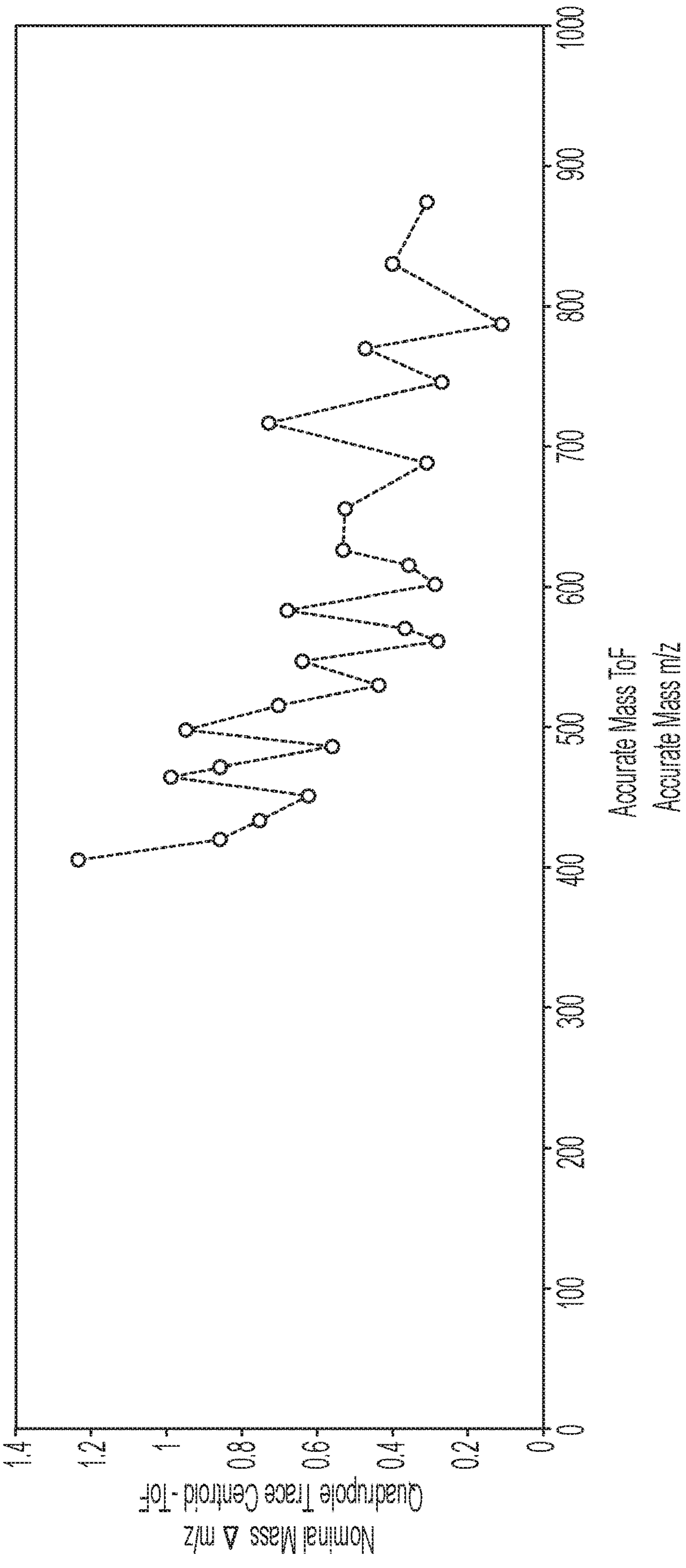
FIG. 4 shows a plot of nominal mass vs. corresponding accurate mass analysis.

Referring to FIG. 4, the nominal mass peak 305 identified from each of the n experiments may be used to generate a plot of nominal mass Δm/z against the corresponding accurate mass analysis result to generate a plot of nominal mass variance for each accurate mass measurement which provides the basis for a calibration curve. As indicated in FIG. 4, the calibration curve is not strictly linear, though there is a general trend with increasing m/z.

Each point of the calibration curve corresponds to a plurality of m points. In general, the m points cluster within a reasonable spread of one another. In some cases, outlier points that vary considerably from the rest of the $m-1$ points for a group and may affect the overall calibration curve can be excluded. Generally, there is only one extreme outlier point per cluster of points, though some embodiments can allow for multiple outliers within a group of points.

Figure 6:
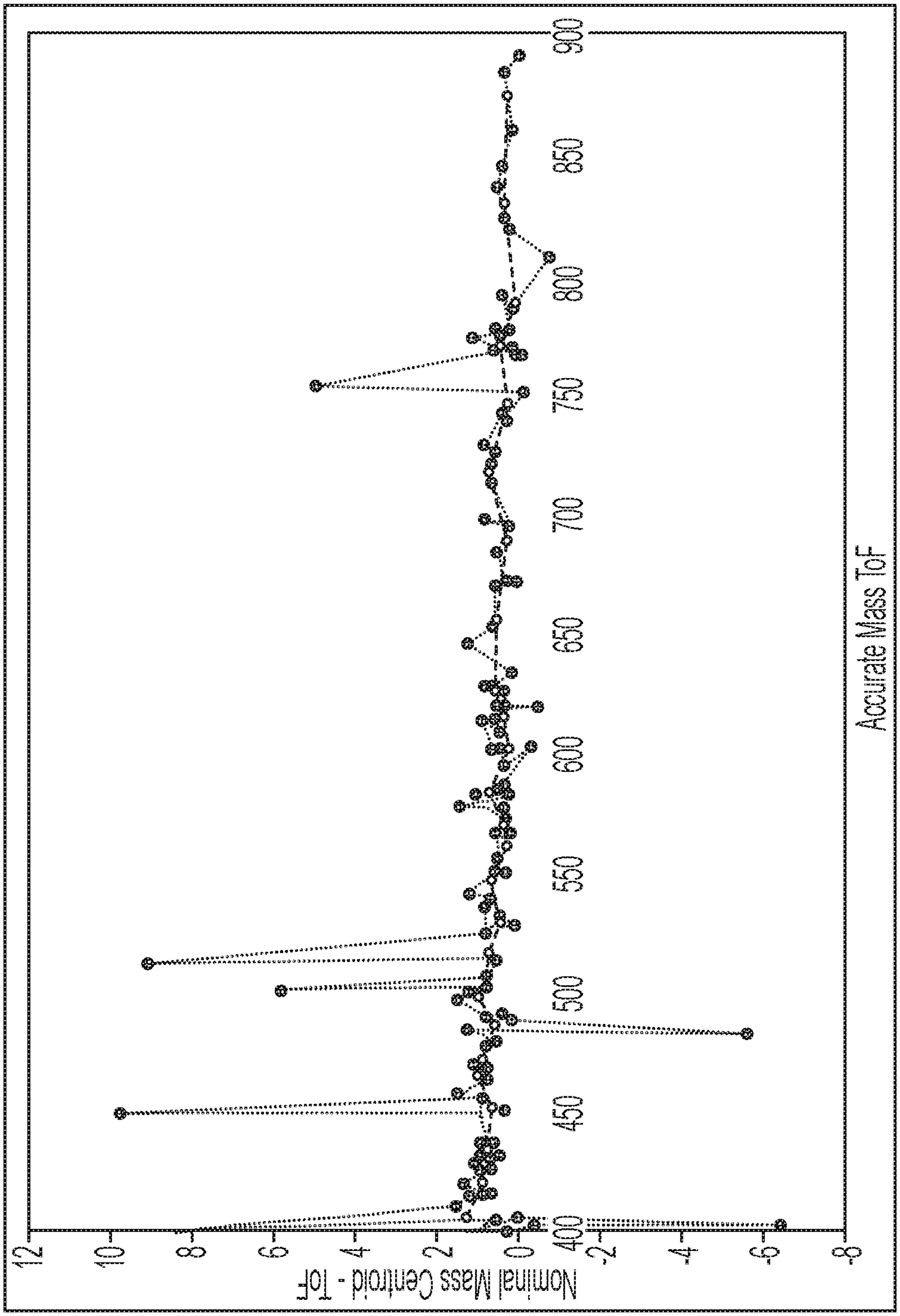
FIG. 6 presents exemplary calibration curves plotted across a mass range of interest.

Referring to FIG. 6, exemplary calibration curves are plotted across a mass range of interest. The calibration curve in solid lines corresponds to the calibration curve of FIG. 4 with outlier rejection. The calibration curve in dashed lines has been calculated from the same set of analysis results with the inclusion of outlier points. As is evident from FIG. 6, a small number of outlier points can greatly affect the calibration curve within a small number of transmission windows, skewing results.

In order to conduct outlier rejection, each cluster of m points may be evaluated to provide a confidence metric based on the spread of that set or cluster of m points. The confidence metric may be based on a variety of known statistical methods including, for instance, Bayesian, standard deviation, etc. The confidence metric can be employed to evaluate whether a point is an outlier from the other points in that group. In some embodiments, local variations within an m/z range, e.g., an m/z range of about 50 to about 100 Daltons, can be employed to identify, and optionally eliminate, outliers.

As a further measure of confidence, the overall calibration curve may be evaluated to confirm an overall trend with increasing m/z.

The confidence metric and trend analysis may be reported in association with the corrected analysis results to provide an indication that the calibration is in line with expectations.

The calibration curve may be applied in a number of different approaches.

In a first embodiment, the analysis results may be corrected by applying the corresponding correction factors obtained from the calibration factor. In this embodiment, the data file may be written with the nominal mass results corrected based on the corresponding correction factors.

In a second embodiment, the correction factors may be applied by editing each experiment to re-classify the transmission window for that experiment based on the corresponding correction factor obtained from the calibration curve. For example, each experiment can be defined by a header which identifies the start and end point of the transmission window for that experiment. In this embodiment, the header may be edited by identifying a transmission window center for that experiment, applying the corresponding correction factor from the calibration curve to generate a corrected transmission window center, and modifying the header start and end locations to reflect the corrected transmission window center. Accordingly, the definition of each transmission window may be modified to shift that window based on the correction factor obtained from the calibration curve for that transmission window.

In some aspects, the shifting of the transmission windows may lead to gaps in the data set. One method to avoid the gaps would be to execute the analysis with slightly overlapping transmission windows. Provided the shift is less than the overlap, then the corrected data would not include any gaps. An alternative method to avoid gaps is to correct the transmission window by forcing a start point of the transmission window to coincide with an end point of a preceding transmission window. The end point of corrected transmission window is then determined by adding half the transmission width to the corrected transmission window center. In this method the transmission window widths will vary slightly from one another, though the variance is too small to affect the analysis results overall.

Figure 5A:
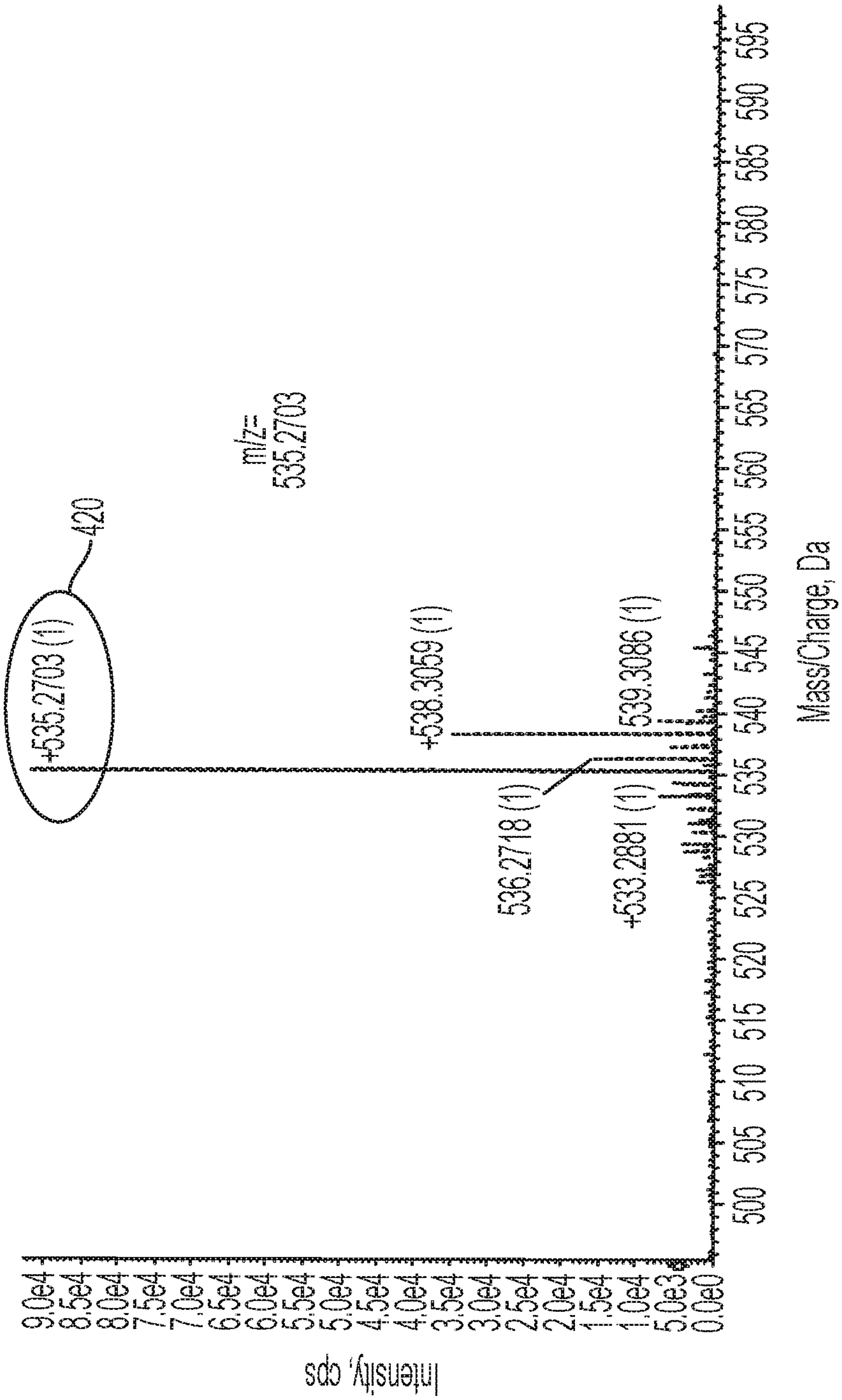
FIGS. 5A and 5C show accurate mass analysis results.
Figure 5B:
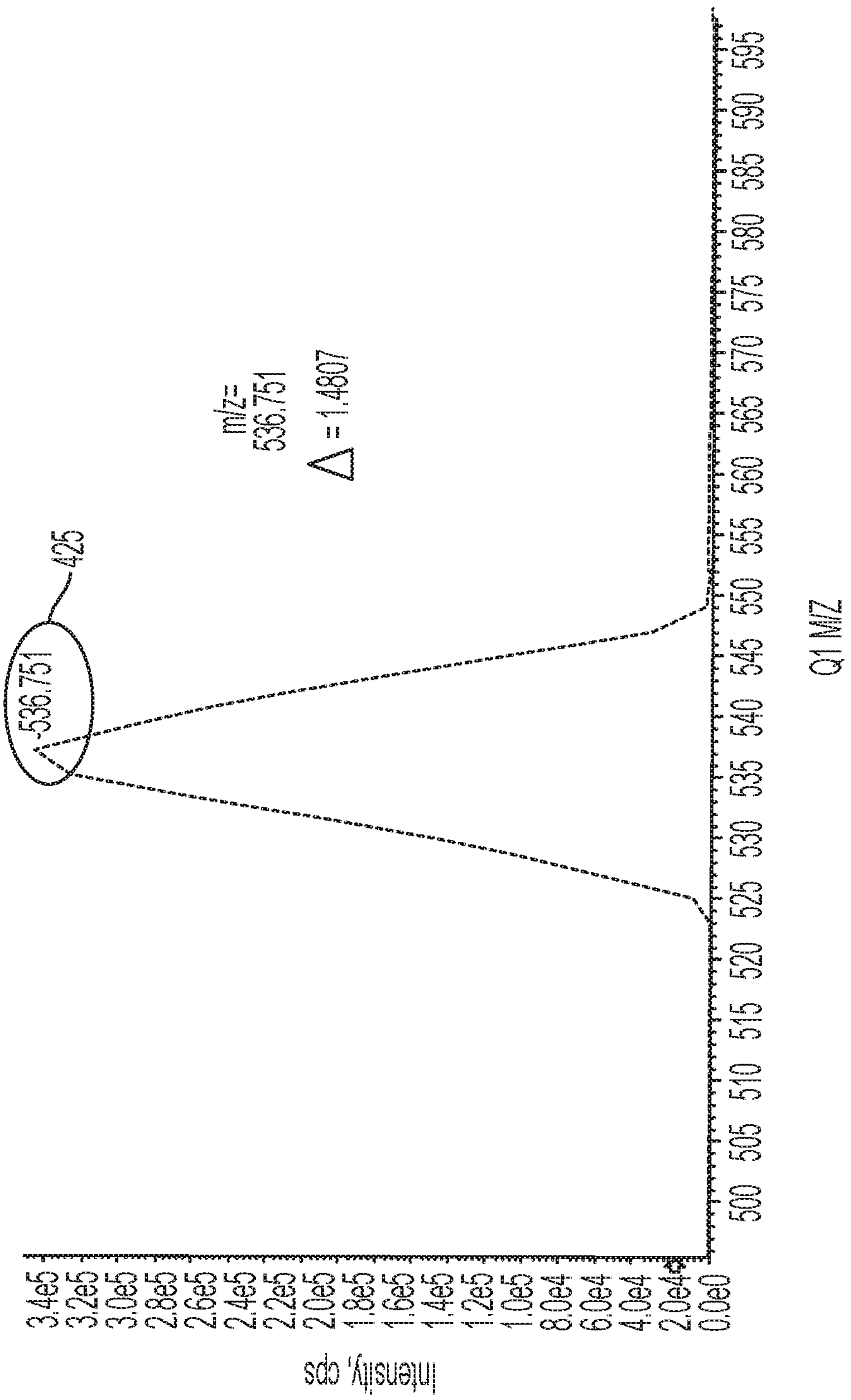
FIGS. 5B and 5D show nominal mass analysis results.
Figure 5C:
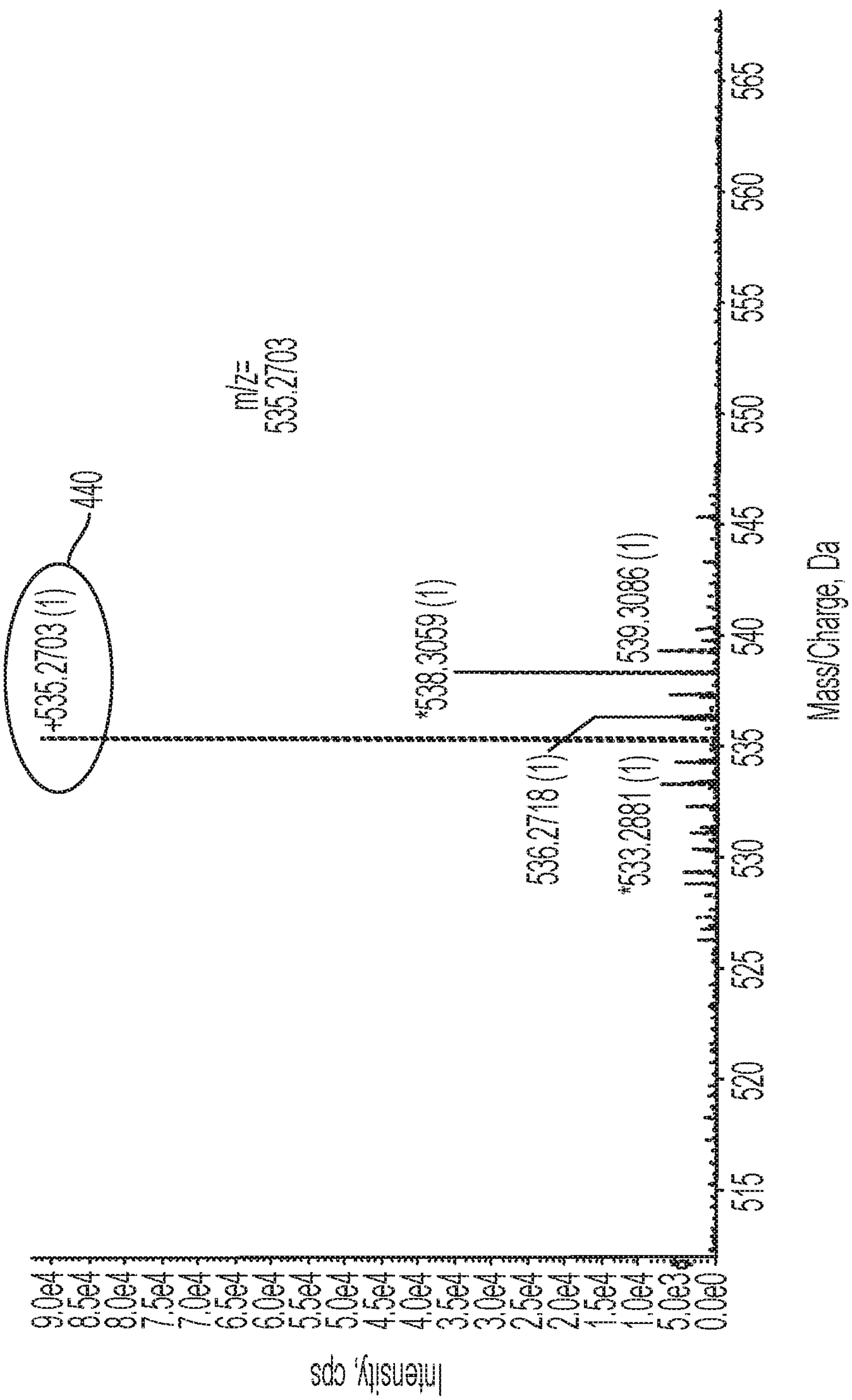
Figure 5D:
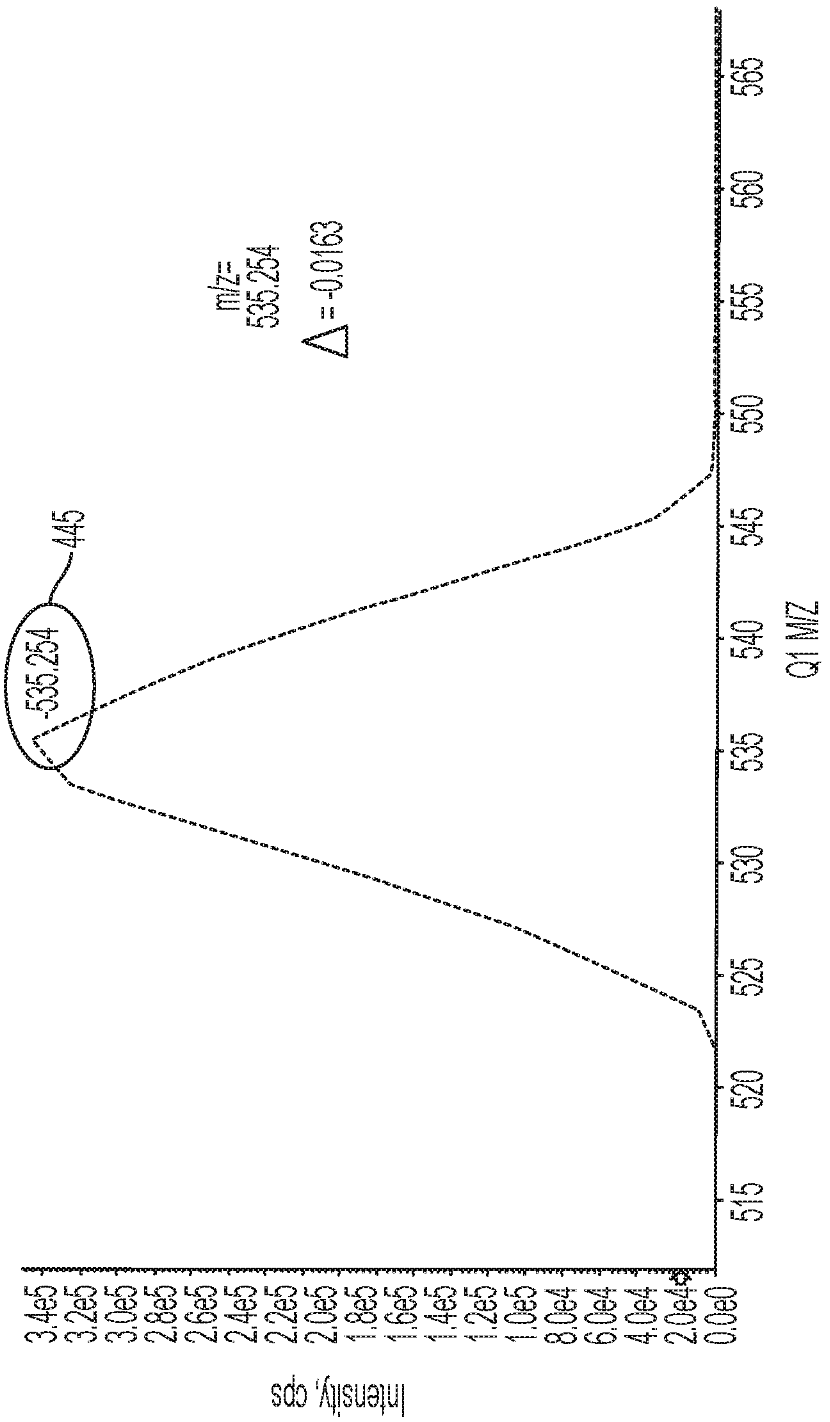

By way of illustration, FIGS. 5A and 5B provide examples of an accurate mass analysis result FIGS. 5C and 5D present the corresponding nominal mass analysis result for a given sample. The accurate mass analysis corresponding to a residual precursor mass peak 420 is at 535.2703 m/z, while the nominal mass analysis result 425 is at 537.751 m/z for the same sample. Accordingly, the accurate mass spectrometer and the nominal mass spectrometer have a variance of 1.4807 m/z. Since the accurate mass spectrometer was previously calibrated using a reference standard, this indicates that the nominal mass spectrometer needs to be corrected by 1.4807 m/z.

In some embodiments, the calibration curve and/or correction factors may be monitored from analysis run to analysis run to confirm general agreement. In the event that the calibration is trending in a particular direction, e.g., the correction factors are growing larger between runs, there may be an indication that the instrument needs servicing or cleaning.

In an embodiment, a hybrid mass spectrometer may be calibrated by: calibrating the accurate mass spectrometer using reference standards and calibrating the nominal mass spectrometer based on captured analysis data by comparing the nominal mass analysis results to the calibrated accurate mass analysis results.

In an aspect, the hybrid mass spectrometer may further be calibrated by evaluating mass measurements from the accurate mass spectrometer and the nominal mass spectrometer and rejecting outlier cases before applying the measurement pairs to a calibration curve.

In an aspect, the hybrid mass spectrometer may be calibrated by calibrating the accurate mass spectrometer using reference standards, calibrating the nominal mass spectrometer using reference standards to generate a plurality of correction factors for each transmission window and scanning speed pair of the nominal mass calibration, and calibrating the nominal mass spectrometer by interpolating between the generated plurality of correction factors to calibrate the nominal mass spectrometer for each analysis transmission window and scanning speed pair used during an analysis run.

In some embodiments, the hybrid mass spectrometer may be calibrated by: calibrating the accurate mass spectrometer using reference standards and calibrating the nominal mass spectrometer based on captured analysis data by comparing the nominal mass analysis results to the calibrated accurate mass analysis results, wherein if a statistical measure of the comparison is outside of a threshold, the nominal mass spectrometer is calibrated based on a nominal mass spectrometer calibration using reference standards. The statistical measure may include, for instance, an indication that there are insufficient points of comparison between the nominal mass spectrometer and the accurate mass spectrometer to generate a calibration curve for the nominal mass spectrometer. The statistical measure may include, for instance, an indication that points of comparison between the nominal mass spectrometer and the accurate mass spectrometer vary too greatly to generate a calibration curve for the nominal mass spectrometer.

Figure 7:
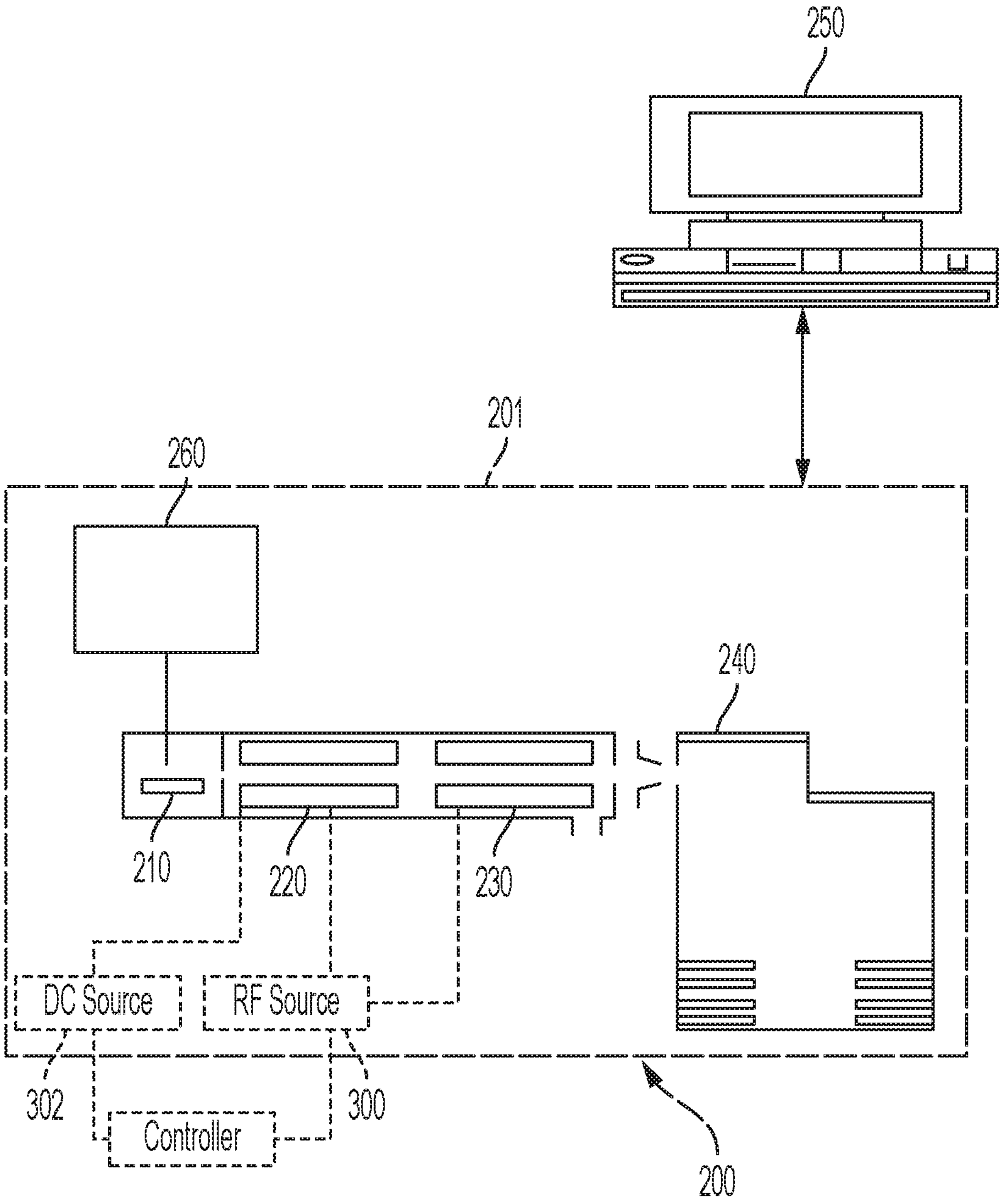
FIG. 7 shows a hybrid mass spectrometer according to an embodiment of the present teachings.

In some embodiments, the nominal mass analyzer can be a quadrupole mass analyzer and the accurate mass analyzer can be a time-of-flight (ToF) mass analyzer. By way of example, FIG. 7 schematically depicts a mass spectrometer 200, which includes an ion source 210, a quadrupole mass analyzer 220, a collision cell 230, a downstream time-of-flight (ToF) mass analyzer 240 and a data processing module 250. A sample delivery device 260, e.g., a liquid chromatography (LC) column, can deliver a sample to the ion source 210, which can ionize one or more target analytes within the sample to generate a plurality of precursor ions.

A variety of ion sources can be employed. Some examples of such ion sources include, without limitation, an electrospray ionization device, a nebulizer assisted electrospray device, a chemical ionization device, a nebulizer assisted atomization device, a matrix-assisted laser desorption/ionization (MALDI) ion source, a photoionization device, among others.

The precursor ions are received by the quadrupole mass analyzer 220, and those precursor ions passing through the mass analyzer 220 are received by the downstream collision cell 230. At least a portion of the precursor ions undergo fragmentation within the collision cell to generate a plurality of product ions. The ions exiting the collision cell 230, which can include the product ions as well as residual precursor ions (i.e., those precursor ions that did not undergo fragmentation) are then received by the downstream time-of-flight (ToF) mass analyzer 240, which generates ion detection signals indicative of the m/z ratios of the ions.

As the ToF mass analyzer 240 is calibrated via the use of reference standards, the m/z ratios determined by the ToF mass analyzer can be considered as accurate m/z ratios for the calibration of the nominal mass analyzer. The ion detection signals are received by the data processing module 250, which analyzes the ToF signals in a manner discussed herein for the calibration of the quadrupole mass analyzer.

Figure 8:
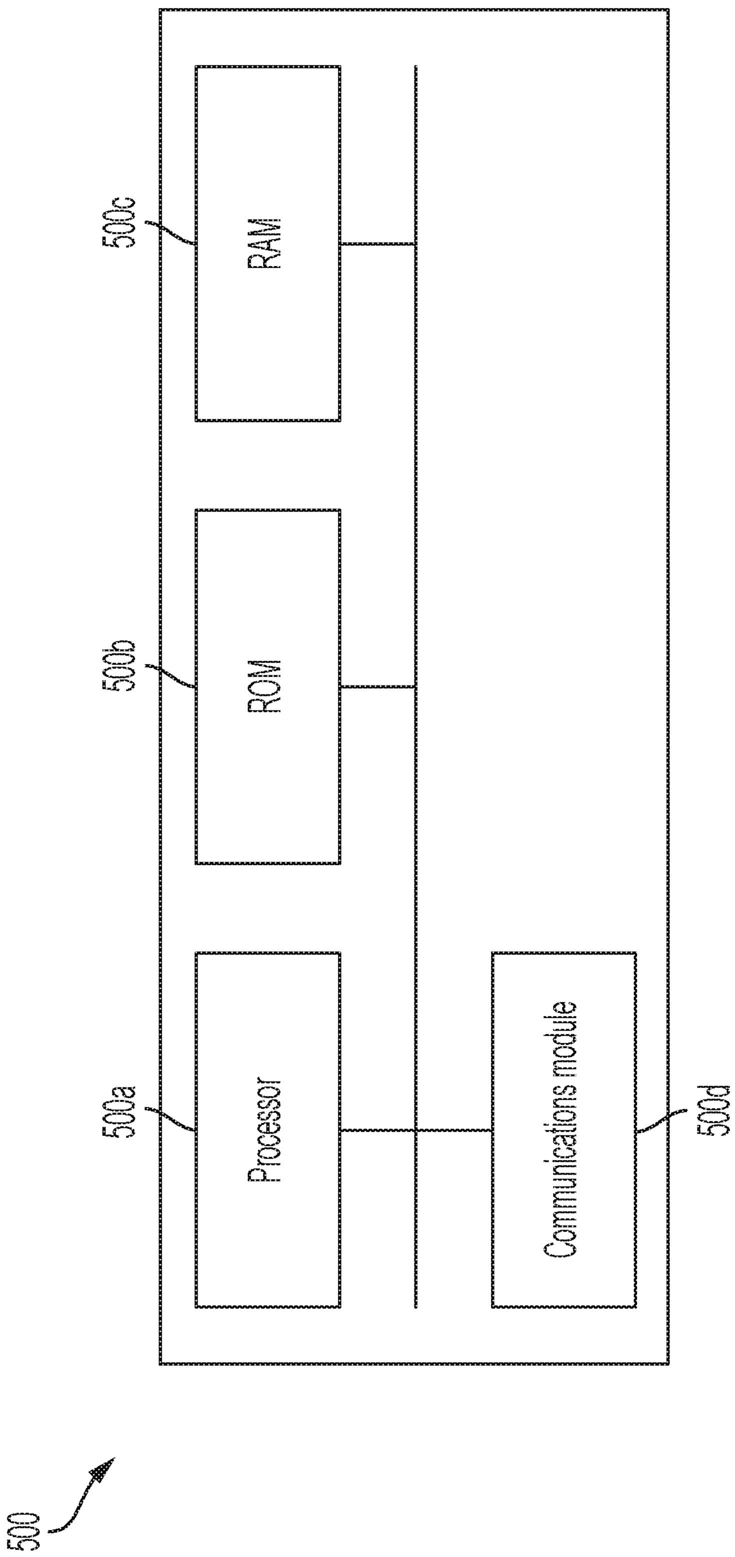
FIG. 8 schematically depicts an example of an implementation of a controller/analysis module suitable for use in the practice of embodiments of the present teachings.

In addition to the components illustrated in FIG. 8, the mass spectrometer 200 can include other components such as various ion guides positioned upstream of the quadrupole mass analyzer.

In this embodiment, the time-of-flight mass analyzer 240 can be calibrated using one or more reference calibrants in a manner known in the art. As such, in this embodiment, the time-of-flight mass analyzer functions as the accurate mass analyzer.

In contrast, the quadrupole mass analyzer functions as the nominal mass analyzer. An RF voltage source 300 and a DC voltage source 302 can apply RF and DC voltages to the quadrupole rods of the quadrupole mass analyzer so as to establish the transmission bandwidth of the quadrupole mass analyzer. The RF voltage source can also apply RF voltages to the rods of the collision cell (which can include, for example, four rods arranged in a quadrupole configuration) to provide radial confinement of the ions. A controller 303 can control the operation of the RF and DC voltage sources.

For example, the controller can cause scanning of the frequency of the RF and/or DC voltages applied to the quadrupole rods of the quadrupole mass filter so as to scan the transmission bandwidth thereof to allow ions with different m/z ratios to pass to the downstream time-of-flight mass analyzer. More specifically, in this embodiment, the ion transmission bandwidth of the quadrupole mass analyzer can be scanned across a mass range so that successive ion transmission windows are overlapping.

Such scanning of the transmission bandwidth of the quadrupole mass analyzer can lead to variation of the intensities associated with the mass signals of the product ions and the residual precursor ions observed in different transmission windows.

In this embodiment, the mass detection signals generated by the ToF mass analyzer can be stored in the precursor dimension as a plurality of data bins, where each data bin has an m/z width that is a fraction of the m/z transmission width of the quadrupole mass filter 220. By way of example, each data bin can have an m/z width that is ⅕ of the transmission bandwidth of the mass filter 220. As noted above, each data bin is considered herein as an experiment.

Referring again to FIG. 2A and as noted above, in some embodiments, an extracted ion chromatogram (XIC) can be generated for every $n^{th}$ experiment. In this case, the $n^{th}$ experiment corresponds to a 2 Dalton data bin extending from 590.5 Dalton to 592.5 Dalton. As illustrated in FIG. 2A, the highest intensity peak within this 2-Dalton data bin corresponds to an m/z ratio of 589.3592. FIG. 2B shows the ion chromatogram as a function of the retention time associated with this 2-Dalton data bin. The peaks in the depicted ion chromatogram in FIG. 2B can be sorted based on their intensities.

In this embodiment, the highest intensity peak at a retention time of 0.921 minutes is selected and the mass spectrum associated with this peak is generated, as shown in FIGS. 3B and 4A. The m/z ratio of the base peak in the mass spectrum (here peak 305) is compared with the m/z range spanned by the respective precursor transmission window to verify that the m/z ratio of the base peak is within that transmission window.

The intensities of the base mass peak in experiments prior to the above 2-Dalton data bin extending between 590.5 Dalton to 592.5 Dalton as well as subsequent to this data bin can be plotted as a function of the respective m/z values of the quadrupole mass analyzer 220, where the total number of experiments can be equal to the number of experiments per quadrupole transmission window.

The plotted data can then be utilized to determine an m/z calibration value for the transmission window of the nominal quadrupole mass analyzer 220. For example, the centroid of the plot can be compared with the ToF-calibrated m/z ratio associated for the base peak to determine the m/z offset required for correcting the nominal calibration of the quadrupole mass analyzer.

As noted above, the header of the data compilation associated with each experiment, which identifies the m/z range corresponding to that experiment, can then be adjusted based on the m/z calibration offset determined via the above process.

The following examples are provided for further elucidation of various aspects of the present teachings and are not provided to indicate necessarily the optimal ways of practicing the present teachings and/or optimal results that may be obtained.

EXAMPLES

Example 1

Scanning SWATH Settings and Operation

The Scanning SWATH runs were acquired with a SCIEX triple quad 6600+ mass spectrometer operating in a SWATH acquisition mode. The following settings were applied in the Scanning SWATH runs: (1) the precursor transmission window was set to 10 m/z and a mass range from 400 m/z to 900 m/z was covered in 0.5 seconds. These settings provided a compromise between identification and quantification performance. Several precursor transmission window sizes ranging from 3 m/z to 20 m/z, covering a precursor range from 400 m/z to 900 m/z, were tested for mass analysis of yeast (*S. cerevisiae*) whole proteome tryptic digests.

The optimal results in terms of identifications and quantitative precision were achieved with window sizes of 10 m/z. Reducing the window size further would result in even higher identification numbers due to less interference but the resulting shorter effective accumulation times would lower the quantitative precision. The raw data was binned in the quadrupole or precursor dimension into 2 m/z bins, providing a resolution in the Q1 dimension (i.e., the quadrupole or precursor dimension) that allows the effective use of the Q1 scores. The MS1 scan was omitted for the benchmarks and the data was acquired in high sensitivity mode.

The instrument control software calculates an RF/DC ramp which is applied to quadrupole mass analyzer. The ramp can be calculated from the experiment start transmission mass, stop transmission mass, transmission width, and the cycle time. The calculation uses previously acquired calibrations to calculate ramps for mass DACS and resolution DACS. The quadrupole start mass can be calculated as experiment start mass minus transmission width, and the quadrupole stop mass can be calculated as the experiment stop mass plus transmission width. This allows obtaining correct precursor profiles of all fragments at the boundaries of the experimental mass range. Collision energy can be calculated using the +2 Rolling Collision energy equation, which provides a linear relationship for a given charge which is a function of m/z.

This results in a small collision energy spread depending on the width of the transmission window relative to the range being scanned. In these experiments, the effect is typically around 1 eV spread for a given precursor.

Scanning SWATH calibration was automated when running a pre-built batch and directly infusing a tuning solution (ESI Positive Calibration Solution for the SCIEX X500 System (SCIEX)) with 266.16; 354.21; 422.26; 609.28; 829.54). Quadrupole response of each standard was measured at transmission window widths 3, 5, 10, 15, and 20 m/z, where each transmission window width was additionally measured while scanning the transmission window of the quadrupole mass analyzer at 500, 1000, 2000 and 3000 m/z/sec. The recorded quadrupole responses for each condition were stored in a three-dimensional matrix, where the dimensions of the matrix were width, speed and m/z.

The values stored in the matrix were observed m/z from theoretical m/z values. Observed precursor m/z was calculated from current pulse number relative to total scan pulses applied as a fraction of scanned mass range plus start mass. An exact calibration curve was therefore derived for each of the acquired scan speeds and widths. For scan speeds and widths in between resulting from experimental parameters, a curve was tri-linearly interpolated.

The instrument acquisition software was configured to store ion detection responses into calculated 2 m/z precursor isolation bins given the current ToF pusher pulse number relative to the start of the scan applying the Scanning SWATH offset curve described above. The 2 m/z precursor isolation bins were organized in the data file as adjacent experiments allowing for the extraction of precursor profiles for any given fragment ion in a given cycle by tracing fragment response across experiments as well as normal chromatographic profiles across cycles.

Example 2

In another experiment, scanning SWATH calibration was obtained while processing each sample file from the sample data itself. An automated algorithm, as described in the present teachings, was employed to identify the maximum residual precursors for each transmission window across the entire sample. This resulted in several accurate mass ToF measurements, where each accurate ToF measurement was paired with the centroid of the quadrupole mass trace associated with a respective quadrupole transmission region, of which there are usually 10 or more per 100 Da.

For example, if 3 residual potential precursor ions were identified per transmission region and the scan range was 500 Da with a transmission width of 10, then there would be 500/10*3=150 calibration point pairs consisting of quadrupole mass and ToF accurate mass. Since it is possible that an intense mass peak within the quadrupole transmission region does not in fact correspond to a residual precursor ion, a selection algorithm was employed to filter out mass peaks using an outlier rejection algorithm which considers local variance. In particular, the local variations (e.g., variation in a range of about 50-100 Daltons) were employed to identify, and optionally eliminate, outlier mass peaks.

Typically, a mass peak was evaluated relative to its neighbors in a 50-100 Da region. Once a multi-point calibration curve was obtained the calibration was applied to the data by updating the begin and the end mass region defined in the header from each experiment for which data was stored such that the center was calculated from the calibration function while maintaining continuity of boundaries in adjacent experiments. In some cases, the calibration curve could be utilized to identify outlier peaks, which were erroneously considered as corresponding to a precursor ion.

A controller and/or an analysis module such as those discussed above suitable for use in the practice of the present teachings can be implemented using hardware, firmware and/or software by employing the techniques known in the art as informed by the present teachings. By way of example, FIG. 9 schematically depicts an example of an implementation of such a controller/analysis module 500, which includes a processor 500*a* (e.g., a microprocessor), at least one permanent memory module 500*b* (e.g., ROM), at least one transient memory module (e.g., RAM) 500*c*, and a bus 500*d*, among other elements generally known in the art.

The bus 500*d* allows communication between the processor and various other components of the controller. In this example, the controller 500 can further include a communications module 500*e* that is configured to allow sending and receiving signals.

Instructions for use by the controller 500, e.g., for adjusting the DC voltages applied to the auxiliary electrodes, can be stored in the permanent memory module 500*b* and can be transferred into the transient memory module 500*c* during runtime for execution. The controller 500 can also be configured to control the operation of other components of the mass spectrometer, such as the ion guide, and mass analyzer, among others.

Although some aspects have been described in the context of a system and/or an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a processor, a microprocessor, a programmable computer or an electronic circuit. In some embodiments, one or more of the most important method steps may be executed by such an apparatus.

Depending on certain implementation requirements, embodiments of the invention can be implemented in hardware and/or in software. The implementation can be performed using a non-transitory storage medium such as a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Those having ordinary skill in the art will appreciate that various changes can be made to the above embodiments without departing from the scope of the present teachings.

The invention claimed is:

1. A method for calibrating a hybrid mass spectrometer comprising an accurate mass analyzer combined with a nominal mass analyzer, the method comprising:
- calibrating the accurate mass analyzer using one or more reference standards,
- analyzing a sample using the nominal mass analyzer and the accurate mass analyzer to generate one or more corresponding nominal and calibrated accurate mass signals associated with the sample, and
- calibrating the nominal mass analyzer by comparing the nominal and the calibrated accurate mass signals,
- wherein said nominal mass analyzer is configured to provide a plurality of ion transmission windows.

2. The method of claim 1, further comprising storing one or more calibration parameters associated with said calibrated nominal mass analyzer.

3. The method of claim 1, further comprising a controller in communication with said nominal mass analyzer for adjusting at least one parameter of an ion transmission window associated with said nominal mass analyzer for generating said plurality of ion transmission windows.

4. The method of claim 3, wherein said nominal mass analyzer comprises a plurality of rods arranged in a multipole configuration and configured for application of RF and DC voltages thereto.

5. The method of claim 4, wherein said controller causes a change in at least one parameter associated with at least one of said RF and DC voltages for generating said plurality of ion transmission windows.

6. The method of claim 3, wherein said controller causes scanning of said at least one parameter for scanning a transmission bandwidth associated with said nominal mass analyzer.

7. The method of claim 1, wherein said accurate mass analyzer comprises a time-of-flight (ToF) mass analyzer.

8. A method for calibrating a mass spectrometer having at least a first and a second mass analyzer, wherein the second mass analyzer is positioned downstream of the first mass analyzer, comprising:
- calibrating said second mass analyzer using one or more reference standards,
- generating a first measurement of a mass signal of a precursor ion using the first mass analyzer and generating a second measurement of a respective mass signal of said precursor ion using the second mass analyzer, and
- calibrating said first mass analyzer via a comparison of said first and second measurements of said mass signal,
- wherein said first mass analyzer is configured to provide a plurality of precursor ion transmission windows.

9. The method of claim 8, wherein said first mass analyzer comprises a quadrupole mass analyzer.

10. The method of claim 8, wherein said second mass analyzer comprises a time-of-flight (ToF) mass analyzer.

11. The method of claim 8, wherein the mass spectrometer further comprises a collision cell positioned between said first and said second mass analyzer for receiving said precursor ion from said first mass analyzer and generating a plurality of product ions via fragmentation of said precursor ion.

12. The method of claim 8, wherein said first measurement of the mass signal corresponds to an m/z ratio of said precursor ion identified based on at least one nominal setting of said first mass analyzer.

13. The method of claim 12, wherein said step of measuring the second mass signal comprises identifying a mass signal associated with said precursor ion in a mass spectrum of ions exiting said collision cell generated by said second mass analyzer and assigning an m/z ratio to said identified mass signal.

14. The method of claim 13, wherein said at least one nominal setting comprises any of a transmission width and a speed for scanning said transmission width.

15. The method of claim 8, wherein said first mass analyzer comprises a plurality of rods arranged in a multipole configuration to which RF and DC voltage can be applied.

16. The method of claim 15, wherein said second mass analyzer comprises a time-of-flight mass analyzer.

17. A hybrid mass spectrometer, comprising:
- a nominal mass analyzer configured to provide a plurality of transmission windows for passage of at least one precursor ion,
- a collision cell positioned downstream of said nominal mass analyzer for receiving said at least one precursor ion and causing fragmentation thereof so as to generate a plurality of product ions,
- an accurate mass analyzer for receiving ions exiting said collision cell and generating a mass spectrum thereof,
- a mass analyzer for receiving one or more operating parameters of said nominal mass analyzer and said mass spectrum generated by said accurate mass analyzer,
- wherein said mass analyzer is configured to identify a mass signal associated with said precursor ion in said accurate mass analyzer and calibrate said nominal mass analyzer based on an m/z ratio of said precursor ion in said mass spectrum and said one or more operating parameters of said nominal mass analyzer.

18. The hybrid mass spectrometer of claim 17, wherein said nominal mass analyzer comprises a plurality of rods arranged in a multipole configured and configured for application of RF and DC voltages thereto.

19. The hybrid mass spectrometer of claim 17, wherein said accurate mass analyzer comprises a time-of-flight mass analyzer.

* * * * *